June 6, 1950   W. W. KRAFT   2,510,590
LIQUID CONTACT DEVICE
Filed Feb. 25, 1948
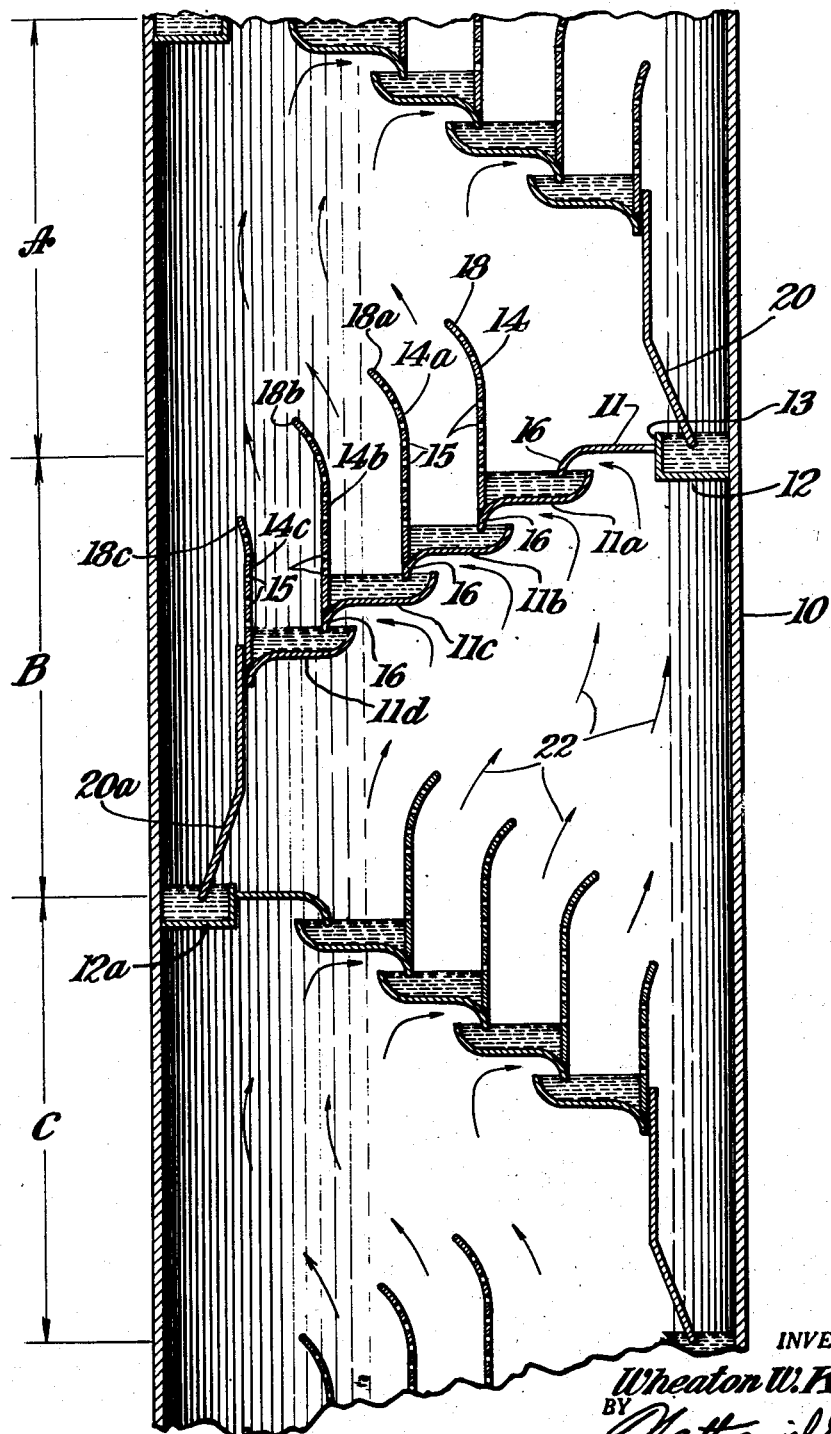
INVENTOR.
Wheaton W. Kraft
BY Nathaniel Ely
ATTORNEY Patented June 6, 1950

2,510,590

UNITED STATES PATENT OFFICE 2,510,590

LIQUID-CONTACT DEVICE

Wheaton W. Kraft, Scarsdale, N. Y., assignor to The Lummus Company, New York, N. Y., a corporation of Delaware Application February 25, 1948, Serial No. 10,604

3 Claims. (Cl. 261—114)

This invention relates to an improved form of vapor-liquid contact apparatus and an improved method of establishing vapor-liquid contact therein.

In the recently issued patent to Koch 2,401,569 of June 4, 1946, a tray of the so-called "Caskade" type has been disclosed. In such construction, the vapor and liquid are brought together in a series of staggered step-like zones or "Caskades" and the vapors or gases and liquid then pass up an extended perforated surface through which the liquid passes. The liquid then passes downwardly to the next step of the "Caskade" while the vapors pass upward and out of the column. Such a construction is claimed to be a substantial improvement over the standard type of bubble cap contact device in that it is more flexible and more efficient.

My invention relates to an improvement in a "Caskade" type of contact apparatus and more particularly to improvements in the arrangement of the Caskade stages for a further improvement in operating conditions.

More specifically, I provide for a material reduction of entrainment of liquid in the released vapors by providing a particularly angularity for the respective baffle plates so that a greater travel of vapors or gases is provided and by providing for a reversal of direction of the vapors any entrained liquid is more completely thrown out.

Further objects and advantages of my invention will appear from the following description of a preferred form of embodiment thereof taken in connection with the attached drawing in which the figure is a substantially central vertical section through a portion of an improved "Caskade" type of vapor-liquid contact column.

The principal characteristic of a "Caskade" type of contact column generally indicated at 10 in the attached drawing is the provision of one or more liquid-vapor contact stages generally indicated at A. These consist of a series of staggered overlapping trough shaped decks or troughs 11, 11a, 11b, 11c, and 11d each of which is arranged to carry liquid from a downcomer trap or liquid reservoir 12 at one side of the column to the next lower trap 12a on the other side of the column. Normally, a weir 13 serves to maintain a predetermined height of liquid in the respective traps.

Each deck 11a, 11b, 11c, and 11d has at its downstream side an upwardly extending baffle plate member generally indicated at 14, 14a, 14b, and 14c. These plate members are generally perforated at 15 for a purpose to be hereinafter described, the lowermost perforation being at a level such that a desired body of liquid will be carried on the deck.

In addition, all of the decks 11 have a downwardly projecting seal portion generally indicated at 16 which extends (in the case of all decks except 11d) into the liquid maintained on the deck below to form a liquid type seal for the vapors tending to rise in the column.

In accordance with my invention, each of the baffle plates 14 to 14c inclusive are inclined as at 18, 18a, 18b and 18c in a particular manner as hereinafter described.

In a liquid contact appartus of this type, liquid entering trap 12 from downcomer 20 as from an upper stage such as A is fed into one of the parallel vapor streams 22 entering from stage B below and the resulting liquid-vapor mixture is hurled violently against the solid lower portion of baffle plate member 14, 14a, etc., with the velocity of the mixture creating considerable centrifugal force as the mixture flows along and up the baffle forcing all of the liquid and a portion of the vapor through the perforations 15. As the load increases the froth is thrown higher along the face of the baffles.

The liquid separates from the vapor on the opposite face of the baffle in a vigorous bubbling action and flows down the baffle to feed into the next lower trough where the operation is repeated. As the liquid passes through the last perforated baffle it drops into downcomer 20a to be fed into the trap 12a below which in turn supplies liquid for stage C. Due to the stair-step arrangement of troughs there is no chance for liquid buildup, so that very large quantities of liquid can be handled. Moreover, since all the liquid passes into each trough successively, all the liquid receives the same treatment.

Due to the violence of vapor-liquid mixing the liquid is broken up into very fine droplets so that high fractionating efficiency is obtained even with cold and relatively viscous oils such as found in absorbers. Furthermore, a large contacting surface is provided by the perforated baffles.

Fundamentally the "Caskade" tray action is that of vapor-liquid mixing and then separation by mechanical means, namely centrifugal force, which provides many times the vapor-liquid separating force available in a bubble tray depending for separation only on the simple difference in density between vapor and liquid.

In accordance with my invention, the tips 18, 18a, 18b, and 18c of the baffles 14, 14a, 14b, and 14c of one stage are directed to the high point of the stage above and away from the entry side of the vapors so that the vapors are forced to take the longest vapor path before passing through the next above stage of decks. As will appear, the vapors as shown by the lines 22 not only must pass upwardly and transversely of the column but must also reverse themselves through at least a 90° turn and in some cases through a greater angle in order to pass laterally under the decks 11 and through the next above liquid reservoir in going from stage B to stage A, for example. At the same time, the vapors pass over the tips 18, etc. in a smooth streamlined fashion with a minimum of resistance.

In accordance with my improvement it is possible to substantially reduce the entrainment which would otherwise be carried by vapors which have undergone such a violent movement against the baffles. In view of the fact that the limitations of a column of this type are very often dependent upon the efficiency of entrainment separation, it is thus possible to materially increase the over all efficiency of the column and efficiency increases of as much as 25% may be expected.

While I have shown and described a preferred form of embodiment of my invention, I am aware that modifications may be made thereto and I therefore desire a broad interpretation of my invention within the scope and spirit of the description herein and the claims appended hereinafter.

I claim:

1. A vapor-liquid contact device comprising a vertical column, a plurality of vertically-spaced, laterally inclined vapor-liquid contact stages in said column arranged for cascade liquid flow alternately from opposite sides of the column, each stage being formed by a series of vertically and horizontally offset and overlapping liquid receiving decks, the downstream side of each deck having a depending seal portion adapted to extend below the surface of the liquid on the deck beneath it to force vapors passing upwardly through the column to flow between the decks and through the liquid on the decks, a perforated baffle plate member extending upwardly from the seal portion of eack deck and having a curved upper tip inclined in a direction away from the upstream side of the deck with which it is associated, the lowermost perforation of each baffle plate member being in a position to maintain a body of liquid on each deck.

2. A vapor-liquid contact device comprising a vertical column, a plurality of vertically spaced, laterally inclined vapor-liquid contact stages in said column arranged for cascade liquid flow alternately in opposed directions transversely of said column, each stage being formed by a series of vertically and horizontally offset and overlapping liquid receiving decks, the downstream side of each deck having a depending seal portion adapted to extend below the surface of the liquid on the deck beneath it to force vapors passing upwardly through the column to flow between the decks and through the liquid on the decks, a perforated baffle plate member extending upwardly from the seal portion of each deck and having a curved upper tip inclined in a direction away from the upstream side of the deck and toward the higher point of the stage immediately thereabove, the lowermost perforation of each baffle plate member being in a position to maintain a body of liquid on each deck.

3. A vapor-liquid contact device comprising a vertical column, a plurality of reservoirs for liquid at different levels along opposite sides of said column, each of said reservoirs being adapted to receive, store, and discharge liquid, a plurality of pairs of vertically spaced, laterally inclined vapor-liquid contact stages in said column, each of said stages extending from a higher reservoir to a lower reservoir on the opposite side of the column, the stage below extending from said lower reservoir to the next lower reservoir on the same side of the tower as said higher reservoir, each of said stages being formed by a series of vertically and horizontally offset and overlapping liquid receiving decks, the downstream side of each deck having a depending seal portion adapted to extend below the surface of the liquid on the deck beneath it to force vapors passing upwardly through the column to flow between the decks and through the liquid on the decks, a perforated baffle plate member extending upwardly from the seal portion of each deck and having a curved upper tip inclined in a direction away from the upstream side of the deck with which it is associated and toward the reservoir of the next higher stage, the lowermost perforation of each baffle plate member being in a position to maintain a body of liquid on each deck.

WHEATON W. KRAFT.

REFERENCES CITED

The following references are of record in the file of this patent:

UNITED STATES PATENTS

| Number | Name | Date |
|---|---|---|
| 1,741,519 | Huff | Dec. 31, 1929 |
| 2,401,569 | Koch | June 4, 1946 |